(12) United States Patent
Sandham

(10) Patent No.: US 9,876,676 B1
(45) Date of Patent: Jan. 23, 2018

(54) METHODS, SYSTEMS, AND COMPUTER READABLE MEDIUMS FOR MANAGING COMPUTING SYSTEMS BY A MANAGEMENT ORCHESTRATION MODULE

(71) Applicant: VCE Company, LLC, Richardson, TX (US)

(72) Inventor: Adrian John Sandham, Cork (IE)

(73) Assignee: VCE IP HOLDING COMPANY LLC, Richardson, TX (US)

( * ) Notice: Subject to any disclaimer, the term of this patent is extended or adjusted under 35 U.S.C. 154(b) by 231 days.

(21) Appl. No.: 14/671,389

(22) Filed: Mar. 27, 2015

(51) Int. Cl.
  *H04L 12/24* (2006.01)
  *H04L 12/815* (2013.01)
  *G06F 9/50* (2006.01)

(52) U.S. Cl.
  CPC .......... *H04L 41/0806* (2013.01); *H04L 41/14* (2013.01); *G06F 9/505* (2013.01); *G06F 9/5061* (2013.01); *G06F 9/5077* (2013.01); *H04L 47/22* (2013.01)

(58) Field of Classification Search
  CPC ................. G06F 9/5088; G06F 9/5083; G06F 2209/4557; G06F 2209/508; H04L 47/125; H04L 41/0896; H04L 67/1002; H04L 67/1008; H04L 67/1004
  See application file for complete search history.

(56) References Cited

U.S. PATENT DOCUMENTS

| | | | | |
|---|---|---|---|---|
| 2004/0075535 | A1* | 4/2004 | Propp | H04B 3/54 370/395.5 |
| 2010/0296397 | A1* | 11/2010 | Fraccalvieri | H04L 41/14 370/230.1 |
| 2010/0296402 | A1* | 11/2010 | Fraccalvieri | H04L 47/22 370/252 |
| 2011/0167421 | A1* | 7/2011 | Soundararajan | G06F 9/5077 718/1 |
| 2012/0102067 | A1* | 4/2012 | Cahill | G06F 17/30575 707/770 |
| 2013/0054776 | A1* | 2/2013 | Kunze | G06F 9/5061 709/224 |
| 2013/0132992 | A1* | 5/2013 | Fellenstein | H04N 7/163 725/19 |
| 2014/0196056 | A1* | 7/2014 | Kottomtharayil | G06F 9/505 718/105 |
| 2016/0004571 | A1* | 1/2016 | Smith | G06F 9/5088 718/105 |

* cited by examiner

*Primary Examiner* — Barbara B Anyan
(74) *Attorney, Agent, or Firm* — Jenkins, Wilson, Taylor & Hunt, P.A.

(57) ABSTRACT

Methods, systems, and computer readable mediums for managing computing systems by a management orchestration module. An example method includes determining that a projected computing load placed on a management computing system by one or more existing tenant computing systems and a new tenant computing system exceeds a threshold computing load, and in response, configuring the new tenant computing system as a remote tenant of the management computing system by deploying remote management software onto the new tenant computing system.

20 Claims, 3 Drawing Sheets

METHODS, SYSTEMS, AND COMPUTER READABLE MEDIUMS FOR MANAGING COMPUTING SYSTEMS BY A MANAGEMENT ORCHESTRATION MODULE

TECHNICAL FIELD

The subject matter of this application relates to managing computing systems. More specifically, the subject matter relates to methods, systems, and computer readable mediums for managing computing systems by a management orchestration module.

BACKGROUND

Information technology (IT) departments have embraced the capabilities of virtualization and cloud computing to move towards a more cost-effective and agile model of delivering IT as a service. Virtualization can provide efficient pooling and standardization of resources. Cloud computing can enable the process automation and self-service mechanisms that allows users to consume infrastructure without manual provisioning and configuration. Some virtualization systems include virtualization orchestration software that can enable simplified deployment of various infrastructure components by automating certain tasks. For example, some virtualization orchestration software can perform tasks ranging from the provisioning of storage to the provisioning of virtual machines to deploying various types of software.

SUMMARY

Methods, systems, and computer readable mediums for managing computing systems by a management orchestration module are disclosed. According to one example, the method includes identifying, by a management orchestration module executing on a management computing system configured to manage one or more existing tenant computing systems, a new tenant computing system installed in addition to the existing tenant computing systems, wherein each of the existing tenant computing systems and the new tenant computing system comprises an integrated rack of data processing, data storage, and computer networking hardware. The method also includes determining, by the management orchestration module, that a projected computing load placed on the management computing system by the existing tenant computing systems and the new tenant computing system exceeds a threshold computing load. The method further includes, in response to determining that the projected computing load exceeds the threshold computing load, configuring, by the management orchestration module, the new tenant computing system as a remote tenant of the management computing system by deploying remote management software onto the new tenant computing system.

BRIEF DESCRIPTION OF THE DRAWINGS

The subject matter described herein will now be explained with reference to the accompanying drawings of which.

DETAILED DESCRIPTION

A computing system such as a converged infrastructure (CI) system can be configured to manage computing systems using a management orchestration module. The management orchestration module can perform tasks ranging from the provisioning of storage to the provisioning of virtual machines to deploying various types of software. The management orchestration module can coordinate the performance of tasks using orchestration workflows. In some examples, the management orchestration module, in response to identifying a new tenant computing system, executes an orchestration workflow to determine whether to configure the new tenant computing system as a remote tenant computing system. The determination can be based on, e.g., using previously deployed tenant computing systems as a reference point.

Figure 1:
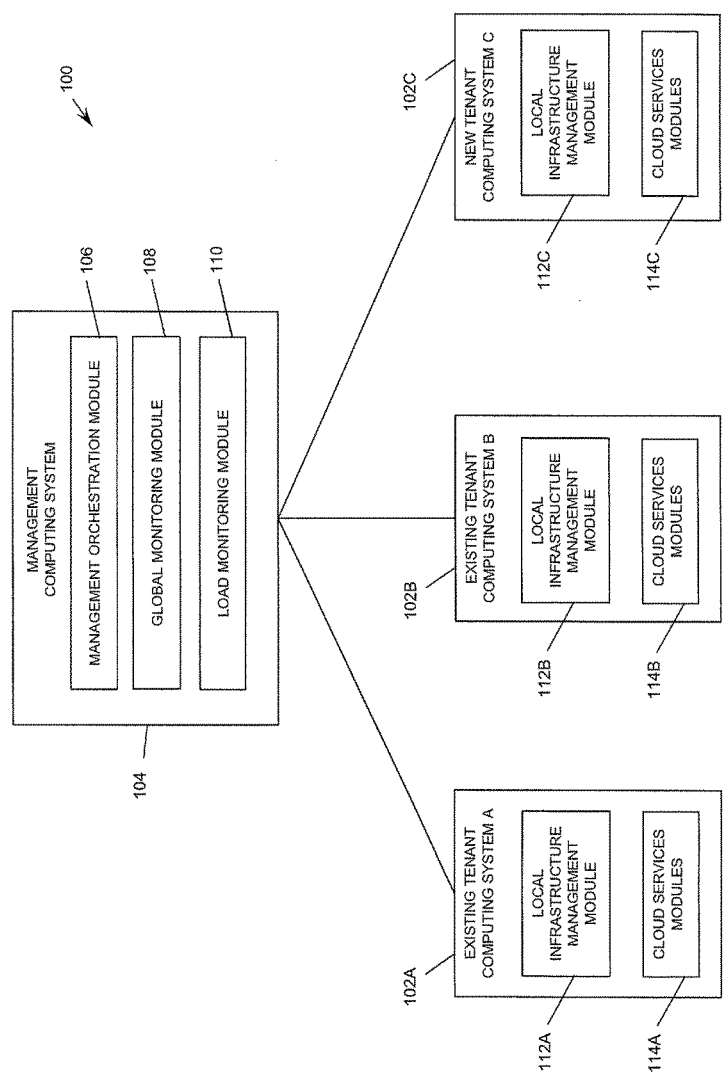
FIG. 1 is a block diagram of a cloud computing system in accordance with examples of the subject matter described herein.

FIG. 1 is a block diagram of an example cloud computing system 100. The system 100 includes a management computing system 104 and a number of tenant computing systems 102A-C that are managed by the management computing system 104. The management computing system 104 and the tenant computing systems 102A-C are configured to communicate over a data communications network.

The management computing system 104 includes one or more computer systems, including at least one processor configured to execute management software stored in memory of the management computing system 104. The memory can store any appropriate number of management software modules. For purposes of illustration, three modules are shown in the management computing system 104 of FIG. 1, including a management orchestration module 106, a system visibility module 108, and a load monitoring module 110.

Each of the tenant computing systems 102A-C can include one or more racks of integrated data processing, data storage, and computer networking hardware. The tenant computing systems 102A-B are configured to execute local infrastructure management modules 112A-C that are configured to perform local infrastructure management tasks and cloud services modules 114A-C which can provide appropriate cloud computing services, e.g., by executing virtualization software, database software, web server software, and the like.

For example, each of the tenant computing systems 102A-C can be a converged infrastructure (CI) system. A CI system, such as a Vblock® System from VCE Company, LLC, can include a single computing platform unit associated with racks of physical CI components and related software for performing virtualization, cloud computing, and/or other information technology (IT) functions. Moreover, a CI system can include multiple computing system resource components, such as physical resources and/or virtual resources, in a preconfigured or prepackaged computing platform, where some resource components are developed and/or manufactured by multiple entities. For example, a CI system can include data storage devices, servers (e.g., web servers, file servers, etc.), networking equipment, and software for managing physical resources and/or virtualized resources (e.g., virtual servers). In some examples, the management computing system 104 is also implemented on a CI system.

The management orchestration module 106 can include virtualization orchestration software that enables deployment of various infrastructure components by automating certain tasks to potentially avoid system administrator involvement. For example, the management orchestration module 106 can automate the provisioning of storage to virtual machines and deploying various types of software. The management orchestration module 106 can automate tasks through the use of workflows that can be called, e.g., using customized web-based interfaces or directly using an application programming interface (API). An orchestration workflow can include a series of related computing tasks, and the tasks can be ordered and dependent on the completion of other tasks.

The management orchestration module 106 implements a scalable, multi-tenant management architecture. The management orchestration module 106 can execute workflows to configure hosts and guests on tenant systems of the architecture, e.g., so that the system as a whole can implement an Infrastructure as a Service (IAAS) system. The management orchestration module 106 can identify potential tenant systems using the global monitoring module 108 and then analyze and configure the potential tenants or directly consume the computing resources of the potential tenant system. In doing so, the management computing system 104 can enable visibility of un-provisioned computing resources and enforce appropriate versioning, e.g., by performing a Release Certification Matrix (RCM) update, before a new tenant is deployed or new hardware is consumed, using automated provisioning via orchestration workflows.

For example, suppose that the system 100 includes two existing tenant computing systems 102A-B and that a system administrator installs a new tenant computing system 102C. The global monitoring module 108 can discover the new tenant computing system 102C, e.g., by periodically polling the network for new devices, and the management orchestration module 106 can identify the new tenant computing system 102 using the global monitoring module 108. Then, the management orchestration module 106 determines whether to configure the new tenant computing system 102C as a remote tenant or to consume the computing resources of the new tenant computing system 102C directly.

In some examples, the management orchestration module 106 executes an orchestration workflow to analyze a log of computing loads placed on the management orchestration module 106 by the existing tenant computing systems 102A-B. The log can be maintained by the load monitoring module 110. Based on the analysis of the log, the management orchestration module 106 determines a projected computing load placed on the management system 104 by the existing tenant computing systems 102A-B and the new tenant computing system 102C.

If the projected load exceeds a threshold (e.g., a threshold computing load), the management orchestration module 106 configures the new tenant computing system 102C as a remote tenant. As a remote tenant, the new tenant computing system 102C is configured to perform one or more management tasks independently of the management orchestration module 106 and is available to execute one or more workflows specified by the management computing system 104. If the projected load does not exceed the threshold, the management orchestration module 106 consumes the computing resources of the new tenant computing system 102C. For example, the management orchestration module 106 can consume the computing resources without configuring the new tenant computing system 102C as a remote tenant, so that the new tenant computing system 102C may be used as a configurable resource of the management orchestration module 106.

By executing an orchestration workflow to integrate the new tenant computing system 102C, the management orchestration module 106 can eliminate or reduce the time required by a manual process conventionally performed by a system administrator. The management orchestration module 106 can ensure exact replication of naming conventions and configuration standards between tenants. The management orchestration module 106 can also enforce RCM compliance before integrating a new tenant computing system into the broader system 100.

Figure 2:
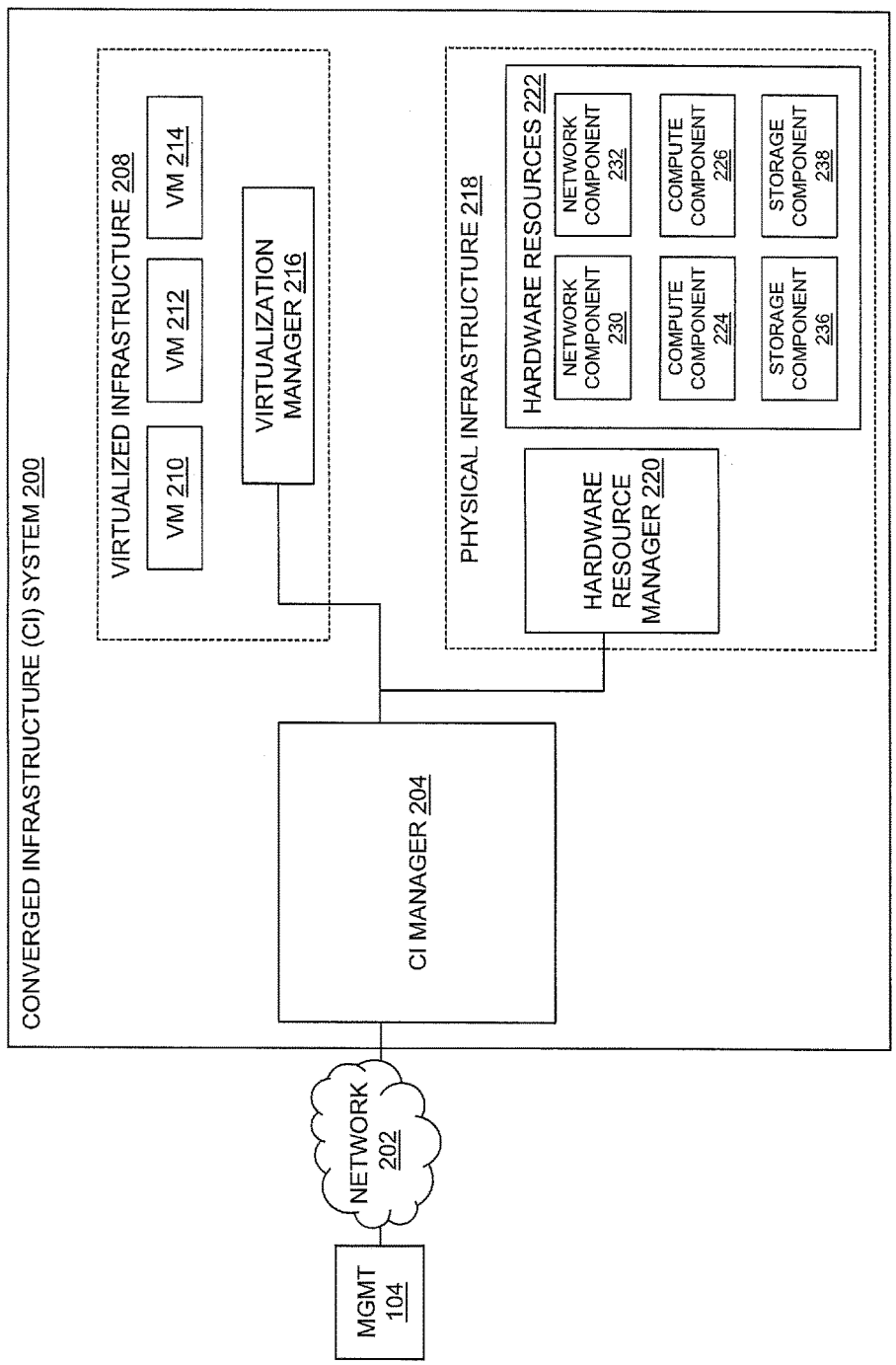
FIG. 2 is a block diagram of a converged infrastructure (CI) system in accordance with examples of the subject matter described herein.

FIG. 2 is a block diagram of an example converged infrastructure (CI) system 200. One or more of the tenant computing systems 102A-C of FIG. 1 can be implemented using the example CI system 200. The CI system 200 can communicate with a management computing system 104 over a data communications network 202.

A CI manager 204 performs management functions and can receive instructions and/or workflows to execute from the management computing system 104. For example, CI manager 204 can be configured to manage performance, resource utilization levels, and other aspects associated with virtualized infrastructure 108 and/or physical infrastructure 118. In some embodiments, CI manager 204 comprises VCE Vision$^{TM}$ Intelligent Operations software and/or firmware. The CI manager 204 can act as the local infrastructure management modules 112A-C of FIG. 1.

The CI system 200 can support cloud services using computing resources existing in both a virtualized infrastructure 208 and a physical infrastructure 218 of the CI system 200. For example, the virtualized infrastructure 208 can include a virtualization environment configured to simulate components of a computing device, such as a processor, system memory, and a storage device, for executing one or more virtual machines (VMs), such as VM 210, VM 212, and VM 214. Each of VM 210, VM 212, and VM 214 can be configured to perform various functions and/or services, such as web server functions or cloud application services, and can interact with various nodes, components, and/or users. The VMs 210-214 can be configured to support cloud service applications.

The physical infrastructure 218 can include hardware resources 222, such as network components 224-226, compute components 228-230, and storage components 232-234. The hardware resources 222 can be communicatively connected to various other resource components in in the CI system 200 and other entities. The hardware resources 222 can be configured for use by one or more virtual entities in the virtualized infrastructure 208. In some examples, network components 224-226 (e.g., network switches) can be configured to enable communication between the resource components in the CI system 200.

The hardware resource manager 220 can be any appropriate entity (e.g., software executing in a virtual machine) for managing aspects associated with the physical infrastructure 218. In some examples, the hardware resource manager 220 can be configured to provision the hardware resources 222 via one or more communications interfaces. For example, the hardware resource manager 220 can provision the hardware resources 222 for implementing one or more virtual entities (e.g., VMs 210-214) in the virtualized infrastructure 208. In some examples, the hardware resource manager 220 can include a management component or entity, such as a unified infrastructure manager (UIM) or a unified computing system (UCS) director entity, which is configured to provision the physical hardware of the CI system 200.

Figure 3:
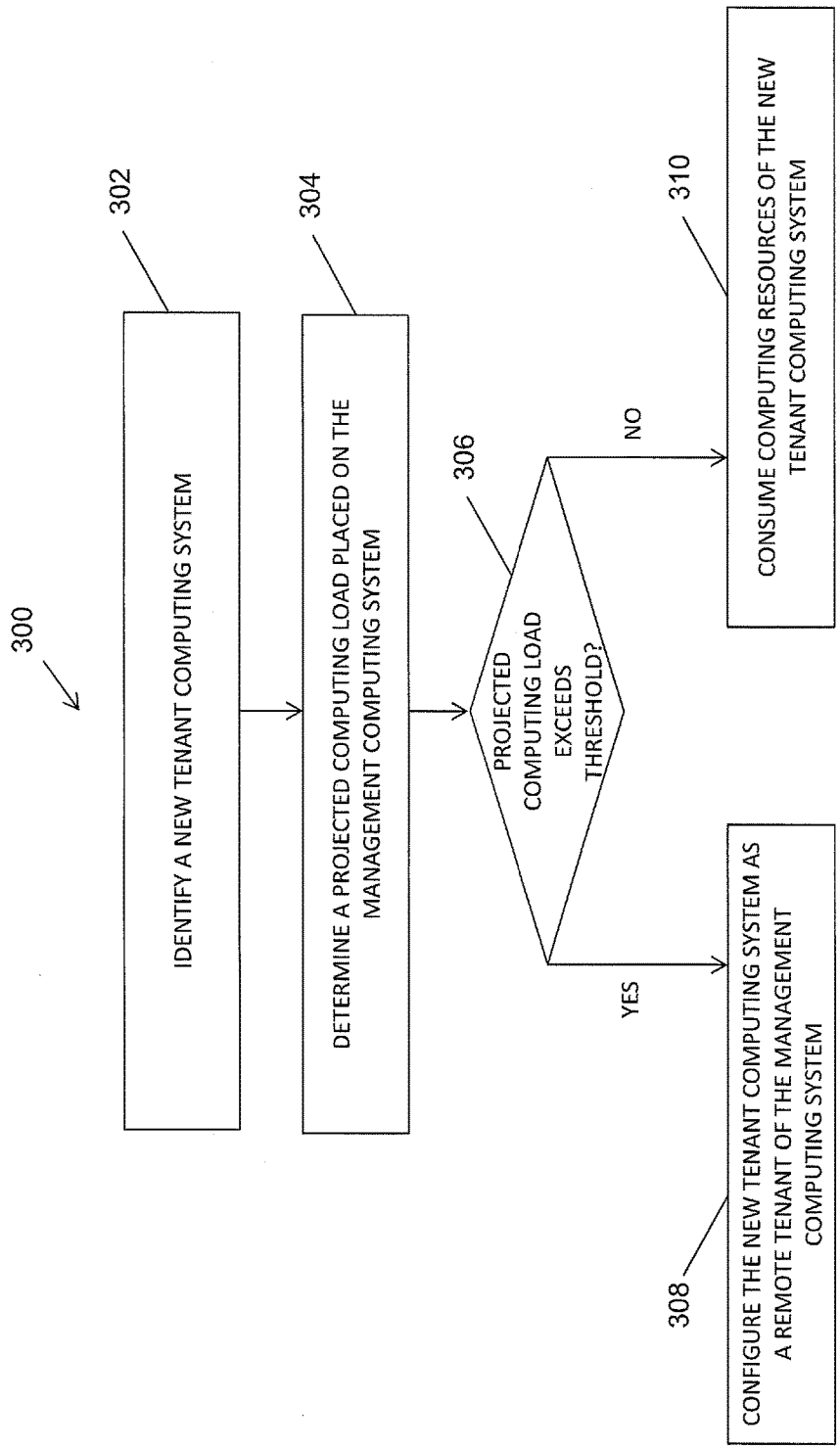
FIG. 3 is a flow diagram of a method for managing computing systems in accordance with examples of the subject matter described herein.

FIG. 3 is a flow diagram of an example method 300 for managing computing systems. The method 300 can be performed by a system of one or more computers. For example, the management computing system 104 of FIG. 1 can perform the method 300 in executing the management orchestration module 106. For purposes of illustration, the method 300 will be described as being performed by the management orchestration module 106 of FIG. 1 while executing a virtualization orchestration workflow.

In block 302, the management orchestration module identifies a new tenant computing system. A system administrator has installed the new tenant computing system in addition to one or more existing tenant computing systems that the management orchestration module is managing. For example, the management orchestration module can identify the new tenant computing system using a global monitoring module. The global monitoring module can enforce RCM compliance on the new tenant computing system and query the new tenant computing system for information characterizing the computing system, e.g., storage and processing capacity. The global monitoring module can pass the information to the management orchestration module.

In block 304, the management orchestration module determines a projected computing load placed on the management computing system. The projected computing load is based on the load from the existing tenant computing systems and a projected computing load for the new tenant computing system. The projected computing load can characterize, e.g., processing demand, memory demand, storage demand, networking demand, or a combination of different types of demands on computing resources.

For example, the management orchestration module can determine a mean or median computing load resulting from the existing tenant systems, and then determine the projected load based on the mean or median computing load. The management orchestration module can multiply the mean or median computing load by the total number of tenant computing systems including the new tenant computing system. In another example, the management orchestration module can issue a query to the new tenant computing system and determine the projected computing load based on a response to the query, which can include information characterizing the computing resources of the new tenant computing system.

In another example, the management orchestration module can access a log specifying, at various times, the computing load placed on the management computing system. The management orchestration module can determine, using the log, an incremental computing load placed on the management computing system as a result of a previous installation of one of the existing tenant computing systems and determine the projected computing load by adding the incremental computing load to an existing computing load from the existing tenant computing systems.

In block 306, the management orchestration module determines whether the projected computing load exceeds a threshold computing load. The management orchestration module can optionally check other information characterizing the new tenant computing system to determine whether the new tenant computing system is suitable to be a remote tenant, e.g., by comparing the other information to a hardware template for a remote tenant.

If the projected computing load exceeds the threshold computing load, then in block 308 the management orchestration module configures the new tenant computing system as a remote tenant of the management computing system by deploying a stack or remote management software onto the new tenant computing system. As a remote tenant, the new tenant computing system is configured to perform one or more management tasks independently of the management orchestration module; for example, the new tenant computing system can execute orchestration workflows. The new tenant computing system is also available to execute one or more workflows specified by the management computing system.

If the projected computing load does not exceed the threshold computing load, then in block 310 the management orchestration module consumes the computing resources of the new tenant computing system. The management orchestration module can provide management services for the new tenant computing system, so that the computing load on the management orchestration module may increase after the management orchestration module beings consuming the computing resources.

The subject matter of this application can be implemented in software in combination with hardware and/or firmware. For example, the subject matter can be implemented in software executed by one or more processors of at least one special purpose machine configured for managing computing systems via a management orchestration module. A system of one or more computers can be configured to perform particular operations or actions by virtue of having software, firmware, hardware, or a combination of them installed on the system that in operation causes or cause the system to perform the operations or actions.

In some examples, the subject matter can be implemented using a computer readable medium storing computer executable instructions, which when executed by one or more processors of a computer, cause the computer to perform operations described in this application. Example computer readable mediums include non-transitory devices, such as disk memory devices, chip memory devices, programmable logic devices, and application specific integrated circuits. In addition, a computer readable medium can be located on a single device or computing platform or can be distributed across multiple devices or computing platforms.

While some systems and methods have been described in reference to specific examples, the utility of the subject matter is not limited to those examples, but rather extends to and encompasses numerous other variations, modifications and alternatives. Various combinations and sub-combinations of the structures and features described are contemplated and will be apparent to a skilled person having knowledge of this disclosure. Any of the various features and elements as disclosed can be combined with one or more other disclosed features and elements unless indicated to the contrary. Correspondingly, the claimed subject matter is intended to be broadly construed and interpreted as including all such variations, modifications and alternatives.

What is claimed is:

1. A method for managing computing systems, the method comprising:
   identifying, by a management orchestration module executing on a management computing system configured to manage one or more existing tenant computing systems, a new tenant computing system installed in addition to the existing tenant computing systems, wherein each of the existing tenant computing systems and the new tenant computing system comprises an integrated rack of data processing, data storage, and computer networking hardware, wherein identifying the new tenant computing system comprises discovering that the new tenant computing system has been installed in addition to the existing tenant computing systems by periodically polling a network for new devices;
determining, by the management orchestration module and in response to discovering that the new tenant computing system has been installed, that a projected computing load placed on the management computing system by the existing tenant computing systems and the new tenant computing system exceeds a threshold computing load; and
in response to determining that the projected computing load exceeds the threshold computing load, configuring, by the management orchestration module, the new tenant computing system as a remote tenant of the management computing system by deploying remote management software onto the new tenant computing system, wherein configuring the new tenant computing system as a remote tenant of the management computing system comprises configuring the new tenant computing system to perform one or more management tasks independently of the management orchestration module and configuring the new tenant computing system to be available to execute one or more workflows specified by the management computing system, and wherein the new tenant computing system is distinct from the management computing system and configuring the new tenant computing system as a remote tenant of the management computing system comprises deploying a stack of remote management software onto the new tenant computing system.

2. The method of claim 1 comprising:
identifying, by the management computing system, a second new tenant computing system;
determining, by the management orchestration module, that a second projected computing load placed on the management computing system by the existing tenant computing systems and the second new tenant computing system does not exceed the threshold computing load; and
consuming, by the management orchestration module, one or more computing resources of the second new tenant computing system.

3. The method of claim 1 comprising determining the projected computing load based on a mean or median computing load of the existing tenant computing systems.

4. The method of claim 1 comprising determining the projected computing load based on a response to a query issued to the new tenant computing system.

5. The method of claim 1 comprising determining the projected computing load by:
accessing a log specifying, at a plurality of times, a management computing load placed on the management computing system;
determining, using the log, an incremental management computing load placed on the management computing system as a result of a previous installation of a first existing tenant computing system; and
determining the projected computing load based on the incremental management computing load.

6. The method of claim 1 wherein each of the tenant computing systems is configured to execute virtualization software, and wherein the management orchestration module is configured to execute one or more orchestration workflows to automate respective management tasks for the virtualization software.

7. The method of claim 1 wherein each of the existing tenant computing systems and the new tenant computing system is a converged infrastructure (CI) system configured to provide a plurality of cloud computing services.

8. A management computing system comprising:
one or more processors;
memory; and
a management orchestration module stored in the memory that, when executed by the one or more processors, causes the processors to perform operations comprising:
identifying a new tenant computing system installed in addition to one or more existing tenant computing systems, wherein each of the existing tenant computing systems and the new tenant computing system comprises an integrated rack of data processing, data storage, and computer networking hardware, wherein identifying the new tenant computing system comprises discovering that the new tenant computing system has been installed in addition to the existing tenant computing systems by periodically polling a network for new devices;
determining, in response to discovering that the new tenant computing system has been installed, that a projected computing load placed on the management computing system by the existing tenant computing systems and the new tenant computing system exceeds a threshold computing load; and
in response to determining that the projected computing load exceeds the threshold computing load, configuring the new tenant computing system as a remote tenant of the management computing system by deploying remote management software onto the new tenant computing system, wherein configuring the new tenant computing system as a remote tenant of the management computing system comprises configuring the new tenant computing system to perform one or more management tasks independently of the management orchestration module and configuring the new tenant computing system to be available to execute one or more workflows specified by the management computing system, and wherein the new tenant computing system is distinct from the management computing system and configuring the new tenant computing system as a remote tenant of the management computing system comprises deploying a stack of remote management software onto the new tenant computing system.

9. The system of claim 8, the operations comprising:
identifying, by the management computing system, a second new tenant computing system;
determining, by the management orchestration module, that a second projected computing load placed on the management computing system by the existing tenant computing systems and the second new tenant computing system does not exceed the threshold computing load; and
consuming, by the management orchestration module, one or more computing resources of the second new tenant computing system.

10. The system of claim 8, the operations comprising determining the projected computing load based on a mean or median computing load of the existing tenant computing systems.

11. The system of claim 8, the operations comprising determining the projected computing load based on a response to a query issued to the new tenant computing system.

12. The system of claim 8, the operations comprising determining the projected computing load by:
- accessing a log specifying, at a plurality of times, a management computing load placed on the management computing system;
- determining, using the log, an incremental management computing load placed on the management computing system as a result of a previous installation of a first existing tenant computing system; and
- determining the projected computing load based on the incremental management computing load.

13. The system of claim 8 wherein each of the tenant computing systems is configured to execute virtualization software, and wherein the management orchestration module is configured to execute one or more orchestration workflows to automate respective management tasks for the virtualization software.

14. The system of claim 8 wherein each of the existing tenant computing systems and the new tenant computing system is a converged infrastructure (CI) system configured to provide a plurality of cloud computing services.

15. A non-transitory computer readable medium having stored thereon executable instructions which, when executed by one or more processors of a management computing system, cause the management computing system to perform operations comprising:
- identifying, by a management orchestration module, a new tenant computing system installed in addition to one or more existing tenant computing systems, wherein each of the existing tenant computing systems and the new tenant computing system comprises an integrated rack of data processing, data storage, and computer networking hardware, wherein identifying the new tenant computing system comprises discovering that the new tenant computing system has been installed in addition to the existing tenant computing systems by periodically polling a network for new devices;
- determining, by the management orchestration module and in response to discovering that the new tenant computing system has been installed, that a projected computing load placed on the management computing system by the existing tenant computing systems and the new tenant computing system exceeds a threshold computing load; and
- in response to determining that the projected computing load exceeds the threshold computing load, configuring, by the management orchestration module, the new tenant computing system as a remote tenant of the management computing system by deploying remote management software onto the new tenant computing system, wherein configuring the new tenant computing system as a remote tenant of the management computing system comprises configuring the new tenant computing system to perform one or more management tasks independently of the management orchestration module and configuring the new tenant computing system to be available to execute one or more workflows specified by the management computing system, and wherein the new tenant computing system is distinct from the management computing system and configuring the new tenant computing system as a remote tenant of the management computing system comprises deploying a stack of remote management software onto the new tenant computing system.

16. The non-transitory computer readable medium of claim 15, the operations comprising:
- identifying, by the management computing system, a second new tenant computing system;
- determining, by the management orchestration module, that a second projected computing load placed on the management computing system by the existing tenant computing systems and the second new tenant computing system does not exceed the threshold computing load; and
- consuming, by the management orchestration module, one or more computing resources of the second new tenant computing system.

17. The non-transitory computer readable medium of claim 15, the operations comprising determining the projected computing load based on a mean or median computing load of the existing tenant computing systems.

18. The non-transitory computer readable medium of claim 15, the operations comprising determining the projected computing load based on a response to a query issued to the new tenant computing system.

19. The non-transitory computer readable medium of claim 15, the operations comprising determining the projected computing load by:
- accessing a log specifying, at a plurality of times, a management computing load placed on the management computing system;
- determining, using the log, an incremental management computing load placed on the management computing system as a result of a previous installation of a first existing tenant computing system; and
- determining the projected computing load based on the incremental management computing load.

20. The non-transitory computer readable medium of claim 15 wherein each of the tenant computing systems is configured to execute virtualization software, and wherein the management orchestration module is configured to execute one or more orchestration workflows to automate respective management tasks for the virtualization software.

* * * * *